(12) United States Patent
Bjornsson et al.

(10) Patent No.: US 11,679,848 B2
(45) Date of Patent: Jun. 20, 2023

(54) METHODS AND SYSTEMS FOR WAVE SLAM MONITORING OF WATER VESSELS

(71) Applicant: Hefring ehf., Reykjavik (IS)

(72) Inventors: Karl Birgir Bjornsson, Reykjavik (IS); Bjorn Jonsson, Reykjavik (IS); Kári Logason, Reykjavik (IS)

(73) Assignee: HEFRING EHF., Reykjavik (IS)

( * ) Notice: Subject to any disclaimer, the term of this patent is extended or adjusted under 35 U.S.C. 154(b) by 0 days.

(21) Appl. No.: 17/490,219

(22) Filed: Sep. 30, 2021

(65) Prior Publication Data

US 2022/0017189 A1 Jan. 20, 2022

Related U.S. Application Data

(63) Continuation of application No. 16/130,112, filed on Sep. 13, 2018, now Pat. No. 11,155,324.

(60) Provisional application No. 62/644,713, filed on Mar. 19, 2018, provisional application No. 62/557,964, filed on Sep. 13, 2017.

(51) Int. Cl.
| | |
|---|---|
| *B63B 79/10* | (2020.01) |
| *G01P 15/14* | (2013.01) |
| *B63B 39/00* | (2006.01) |
| *B63B 49/00* | (2006.01) |
| *G05D 1/08* | (2006.01) |
| *B63B 71/10* | (2020.01) |
| *B63B 1/20* | (2006.01) |

(52) U.S. Cl.
CPC ............ *B63B 79/10* (2020.01); *B63B 39/005* (2013.01); *B63B 49/00* (2013.01); *B63B 71/10* (2020.01); *G01P 15/14* (2013.01); *G05D 1/0875* (2013.01); *B63B 2001/201* (2013.01)

(58) Field of Classification Search
CPC ......... B63B 79/15; B63B 79/40; B63B 71/10; B63B 39/005; B63B 49/00; B63B 2001/005; B63B 79/00; G05D 1/0875; G01P 15/14; B60N 2/501
See application file for complete search history.

(56) References Cited

U.S. PATENT DOCUMENTS

| | | | | |
|---|---|---|---|---|
| 3,427,038 A | * | 2/1969 | Gauss | .................... B60G 17/08 |
| | | | | 297/232 |
| 3,428,788 A | * | 2/1969 | Williams | ................. G06G 7/70 |
| | | | | 701/400 |

(Continued)

FOREIGN PATENT DOCUMENTS

JP 2012051500 A * 3/2012

*Primary Examiner* — David L Singer
(74) *Attorney, Agent, or Firm* — Workman Nydegger

(57) ABSTRACT

A method of monitoring accelerations on a vessel includes measuring acceleration on the vessel using one or more sensors. The one or more sensors are communicatively coupled to a computing unit. Real-time acceleration information representative of an acceleration on the vessel based at least in part on the measured acceleration from the one or more sensors is generated. Acceleration prediction information representative of predicted wave slam using the computing unit is generated. Using the acceleration prediction information, automatic control of trim, steering, or throttle controls of the vessel is performed in a fashion computed to reduce the effects of the predicted wave slam.

20 Claims, 5 Drawing Sheets

(56) References Cited

U.S. PATENT DOCUMENTS

| | | | | |
|---|---|---|---|---|
| 4,933,678 A * | 6/1990 | Tennyson | ............... | G01S 13/88 342/26 C |
| 6,108,031 A * | 8/2000 | King | ............... | H04N 13/194 348/E13.071 |
| 6,158,376 A * | 12/2000 | Vorus | ............... | B63B 39/005 114/284 |
| 8,215,252 B1 * | 7/2012 | Chun | ............... | B63B 39/08 440/51 |
| 8,614,633 B1 * | 12/2013 | Lear | ............... | G08B 29/188 340/984 |
| 9,697,743 B2 * | 7/2017 | Regan | ............... | A63B 69/0093 |
| 9,816,812 B2 * | 11/2017 | Huntsberger | ............... | G01C 11/00 |
| 10,351,221 B1 * | 7/2019 | Anschuetz | ............... | G05D 1/0875 |
| 2001/0044661 A1 * | 11/2001 | Kaji | ............... | G05B 13/0265 700/28 |
| 2003/0204382 A1 * | 10/2003 | Julier | ............... | G06F 17/18 702/196 |
| 2004/0022416 A1 * | 2/2004 | Lemelson | ............... | G07C 5/0891 382/104 |
| 2004/0024503 A1 * | 2/2004 | Swinbanks | ............... | B63B 17/0081 701/38 |
| 2005/0251300 A1 * | 11/2005 | Hellvik | ............... | B63B 39/14 701/33.4 |
| 2005/0278094 A1 * | 12/2005 | Swinbanks | ............... | B63B 39/005 701/37 |
| 2009/0276105 A1 * | 11/2009 | Lacaze | ............... | G05D 1/0206 701/2 |
| 2011/0169625 A1 * | 7/2011 | James | ............... | B60W 30/095 340/439 |
| 2011/0175754 A1 * | 7/2011 | Karpinsky | ............... | B60K 35/00 340/963 |
| 2012/0253566 A1 * | 10/2012 | Ballou | ............... | B63B 79/40 701/21 |
| 2014/0114509 A1 * | 4/2014 | Venables | ............... | B63B 39/06 701/21 |
| 2015/0057836 A1 * | 2/2015 | Plante | ............... | G07C 5/085 701/1 |
| 2015/0088346 A1 * | 3/2015 | Lee | ............... | B63B 79/30 356/32 |
| 2015/0370252 A1 * | 12/2015 | Hanson | ............... | B63G 8/22 701/2 |
| 2016/0084939 A1 * | 3/2016 | Hasegawa | ............... | G01S 13/42 342/147 |
| 2017/0309092 A1 * | 10/2017 | Rosenbaum | ............... | G01M 17/007 |
| 2017/0312614 A1 * | 11/2017 | Tran | ............... | G06F 3/00 |
| 2017/0318360 A1 * | 11/2017 | Tran | ............... | A63F 13/212 |
| 2017/0369127 A1 * | 12/2017 | Cusano | ............... | B63B 79/20 |
| 2018/0268677 A1 * | 9/2018 | Drouet | ............... | G08B 25/002 |
| 2018/0372504 A1 * | 12/2018 | Singhal | ............... | G08G 1/0141 |
| 2019/0108692 A1 * | 4/2019 | Du | ............... | B60W 50/14 |

* cited by examiner

Legend
1     Planing Hull Craft
2     Computing Unit
3     Sensor
4     Sensor
5     Sensor
6     Sensor
7     Display Unit
8     Vibration Alarm
9     Audible Alarm
10    Engine Data Instruments
11    Communications Network Module
12    External Weather Data Receivers
13    Wind Data Instruments
14    GPS Receiver(s)
15    Nautical Chart Plotter
16    Network Connection Module
17    Network Connection Hardware

METHODS AND SYSTEMS FOR WAVE SLAM MONITORING OF WATER VESSELS

CROSS-REFERENCE TO RELATED APPLICATIONS

This application is a continuation of U.S. patent application Ser. No. 16/130,112 filed Sep. 13, 2018, entitled "METHODS AND SYSTEMS FOR WAVE SLAM MONITORING OF WATER VESSELS," which claims the benefit of and priority to U.S. Provisional Patent Application Ser. No. 62/557,964 filed on Sep. 13, 2017 and entitled "METHODS AND SYSTEMS FOR WAVE SLAM MONITORING" and U.S. Provisional Patent Application Ser. No. 62/644,713 filed on Mar. 19, 2018 and entitled "METHODS AND SYSTEMS FOR WAVE SLAM MONITORING," which applications are expressly incorporated herein by reference in their entireties.

BACKGROUND

Background and Relevant Art

Small craft vessels that average from 3 to 20 meters in length and are capable of reaching speeds in excess of 20 knots are often referred to as planing crafts or planing vessels. They can serve multiple purposes and are used by various organizations. The types of crafts and the organizations that use them include: special-purpose crafts, used by navies, coast guards, search and rescue associations, customs patrol, and law enforcement; specialized work crafts, used in fishing and fish farming, and by offshore oil and windfarms, and research projects; tourist cruise crafts, used by expedition companies, whale-watching companies, boat charters, sea safari companies, snorkeling companies; yacht tenders and chase boats, used for transportation by yacht owners and charter companies; or simply as personal watercrafts used by private owners.

While planing craft vessel types and their use are both various and widespread, the hull forms on which they are built tend to be very similar. These hulls are typically referred to as planing hulls due to the way they rise up and glide, or plane, on top of the water when enough power is supplied by propulsion mechanisms. This allows planing hulls to travel rapidly across the water. Alternatively, larger vessels tend to be built on displacement hulls due to the increased propulsion power needed to get them up to plane. These vessels having displacement hulls are limited to slower speeds as they move through the water by pushing the water aside.

Vessels with planing hulls tend to operate in a similar fashion to displacement hulls when at slow speeds, but as they move faster, they climb vertically to the surface of the water. Vessels with planing hulls tend to ride almost on top of the water, minimizing friction and water displacement, allowing them to reach high speeds.

Planing hulls however have a large drawback. Particularly, a planing vessel will dip its stern downwards while the bow rises vertically out of the water as the vessel picks up speed. As the front of the hull is out of the water, waves that hit the vessel from the front will force the vessel to surge longitudinally out of the water, causing it to jump and aggressively slam down again. Likewise, waves that hit from the side will cause the vessel to sway in a portstarboard motion.

These movements can cause intense mechanical shocks that can lead to both acute and chronic physiological problems for o and passengers, and mechanical problems for vessels and expensive equipment onboard, due to the excessive accelerations that result from such impacts. A study was conducted by the Naval Health Research Center on self-reported injuries among special boat operators in the US Navy (Ensign W et al. [2000] 'A Survey Of Self-Reported Injuries Among Special Boat Operators' Naval Health Research Center). The sample mean age of respondents was 32.0±5.9 years, mean years of military service was 12.0±5.5 years and the mean time in Special Boats was 4.7±3.0 years, where respondents were asked to report on injuries sustained during their time as Special Boat Operators.

The study found that 65% of operators have suffered injuries caused by the shocks of wave slamming. The most prevalent type of injury was sprains and strains (49.3%), disc problems (7.9%), and trauma (7.9%). The most prevalent injury sites were the lower back (33.6%), knee (21.5%), and shoulder (14.1%). Injuries like these are costly, as this study showed. These injuries resulted in a total of 145 days of hospitalization, 440% higher than the overall Navy Average, 929 days of sick leave, 4,223 days of limited duty, 4,218 days of limited job or mission performance, 2,294 days of lost mission training time, and 4,089 days of lost physical conditioning time.

This study clearly showed a relationship between repeated mechanical shock exposure from wave slamming and injury occurrence. Likewise, another study on the mechanical shock on high speed planing boats, from the Department of Ocean Engineering and Mechanical Engineering at Massachusetts Institute of Technology (Kearns, S D. [2001] 'Analysis and Mitigation of Mechanical Shock effects on High Speed Planing Boats.' Department of Mechanical Engineering, Massachusetts Institute of Technology), found that a clear correlation clearly exists between service time aboard high-speed boats and an increased rate of acute and chronic injury, where the mechanical shock environment on such vessels may be extremely severe depending on sea-state and other environmental and mechanical factors. The study concluded that shock mitigation systems currently available are insufficient to protect crew and passengers from injury and that this is a problem that needs to be better addressed.

While no single standard or directive addresses this issue of mechanical shocks and vibrations in small vessels, the European Directive 2002/44/EC addresses the problem of Whole Body Vibrations (WBVs), defined in ISO 2631-1: 1997 by creating limitations on human exposure to mechanical vibrations and shocks. While this directive was originally intended for operators of machinery, and therefore has its limitations in the marine sector, it has become widely used as a standard for defining human tolerance of shocks and vibrations in small vessels, and in particular, high speed vessels.

In procurement tenders for high-speed crafts in Europe, public and private organizations request that bidders' offerings adhere as closely as possible to the European Directive 2002/44/EC, which in some cases is used as a criteria for bidder selection. The United States has yet to determine a defined standard by which bidders' offerings must adhere to in terms of shocks and vibrations.

In the European Directive 2002/44/EC on WBVs, the accepted guidance caution zone is defined as being above 0.57 g, where impacts above this value are considered to be hazardous. However, many manufacturers and buyers in the industry disagree with the relevance of this standard, as staying within the defined caution zone is considered to be unrealistic when operating high speed crafts. This is because the standard was originally created to determine the caution zones for prolonged exposure to vibrations, as opposed to the impacts and shocks more relevant to high speed crafts.

Several other standards are in place, such as ISO 2631:5 (the relevance of which is also contested by many), Annex 10 of 2000 HSC CODE: International Code of Safety for High-Speed Craft, and the MCA Marine Guidance Note MGN 436. Guidelines have been put in place, such as the High Speed Craft Human Factors Engineering Design Guide, sponsored by the UK MOD Defence Equipment & Support Agency (DE&S), and the Human Element Competencies Templates, which help guide procurement agencies, vessel designers and naval architects by placing Human Factors (HF) requirements, which prioritize safety and ergonomic factors, at the center of purchasing and design decisions.

Despite this, most planing vessels in operation today are still detrimentally impacted by mechanical shocks and vibrations despite these directives, standards and guidelines. Some attempts have been made to improve the safety of operators and crew on high speed vessels. For instance, the most common method of mitigating the harmful effects of wave slamming is through the use of shock absorbing seats. While the use of shock absorbing seats significantly reduces the impact experienced by the operator and crew onboard, the impact experienced is still significant and can still cause serious injuries. The use of shock absorbing seats also does not have any influence on the mechanical shocks that impact the vessel itself and the equipment onboard, which suffer significant wear and tear and degrade faster due to the effect of these impacts.

Reducing these mechanical shocks is therefore in the best interest of: vessel operators and crew; vessel owners (including organizations, institutions and/or individuals), and insurance companies (which insure against the risk of injury and damage and face the risks associated with hazards). As the issues of mechanical shock exposure become more widely recognized and accepted, interest has grown among researchers and organizations to equip vessels with force-recording sensors for the purposes of study and analysis.

There is thus a need for a method and/or system for mitigating damage to property and injury to personnel caused by mechanical shocks experienced on vessels and small crafts.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A method of monitoring accelerations on a vessel includes measuring acceleration on the vessel using one or more sensors. The one or more sensors are communicatively coupled to a computing unit. Real-time acceleration information representative of an acceleration on the vessel based at least in part on the measured acceleration from the one or more sensors is generated. Acceleration prediction information representative of predicted wave slam using the computing unit is generated. Using the acceleration prediction information, automatic control of trim, steering, or throttle controls of the vessel is performed in a fashion computed to reduce the effects of the predicted wave slam.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
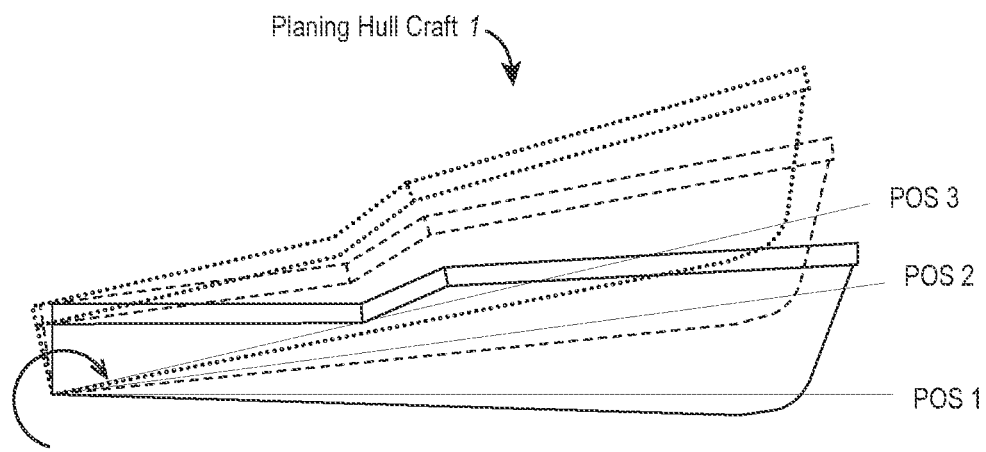
FIG. 1 is a side, starboard, view of a planing hull in three positions, POS 1, POS 2 and POS 3, indicating the direction of acceleration experienced by the hull in the longitudinal, stern-bow, direction according to an embodiment.

A better understanding of different embodiments of the disclosure may be had from the following description read with the accompanying drawings.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

Any element in a claim that does not explicitly state "means for" performing a specified function, or "step for" performing a specific function is not to be interpreted as a "means" or "step" clause as specified in 35 U. S. C. § 112(f).

Embodiments of the present disclosure advantageously can collect, store and analyze data on acceleration forces from mechanical shocks to a vessel, along with, optionally, weather, wind, engine, and/or navigational data, to compute real-time information on acceleration experienced caused by wave slamming, and to make predictions of the potential of hazardous situations likely to occur in the near future on a particular sea journey. Furthermore, embodiments of the present disclosure may then present the real-time information and prediction information to the boat operator, alerting the operator of current and potential acceleration hazards through visual, aural and/or tactile alerts. Alternatively, or additionally, embodiments may implement and/or assist with automated control of a vessel to avoid wave slamming impacts and/or mitigate damage from such impacts.

Figure 2:
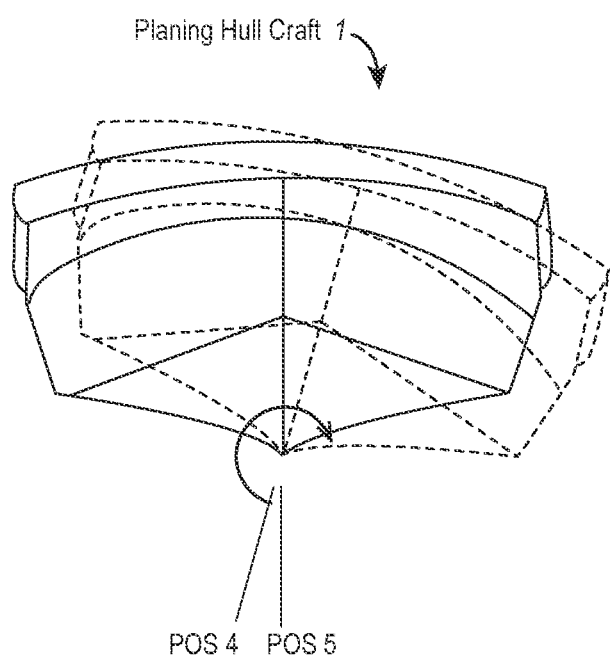
FIG. 2 is a back, stern, view of a planing hull in two positions, POS 4 and POS 5, indicating the direction of acceleration, or roll, experienced by the hull in the port-starboard, or sway, direction according to an embodiment.

To facilitate understanding of the present disclosure, FIGS. 1 and 2 illustrate a vessel, which in the present example is a planing hull craft 1, in various positions along with identifications of associated movements and accelerations. Referring initially to FIG. 1, the planing hull craft 1 is illustrated in three positions, POS 1, POS 2 and POS 3, indicating the acceleration forces experienced by the planing hull craft 1 in a longitudinal, stern-bow, motion.

Additionally, FIG. 1 shows the movements created both as the planing hull craft 1 climbs onto an incoming wave longitudinally and as it slams back down when it clears the wave. The acceleration forces created by the mechanical shocks experienced from the rapid movements through POS 1, POS 2 and POS 3 illustrated in FIG. 1 are damaging to operators and crew, the mechanical structure of the vessel, and equipment onboard. For operators and crew, these forces are the leading cause of lower back, and in particular disc, related injuries.

FIG. 2 shows a back, stern, view of a planing hull craft 1 in two positions, POS 4 and POS 5, indicating the roll, port-starboard, motions and the acceleration forces they generate experienced by the planing hull craft when waves strike the vessel in the port or starboard sides of the hull. The roll motion and the mechanical shocks caused, as indicated by POS 4 and POS 5 are some of the leading causes of knee-related injuries for operators and crew.

Figure 3:
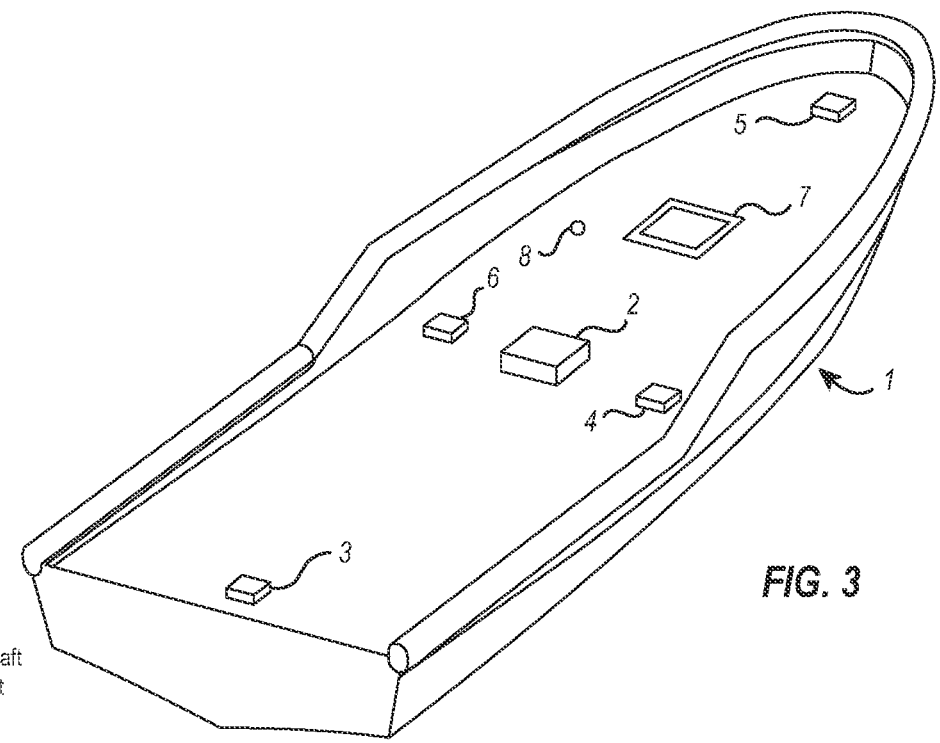
FIG. 3 is an isometric view of a planing hull craft, indicating the primary modules required for the solution. Elements include a planing hull craft, a computing unit, sensors, a display unit, and a mechanical vibration device according to an embodiment.
Figure 4:
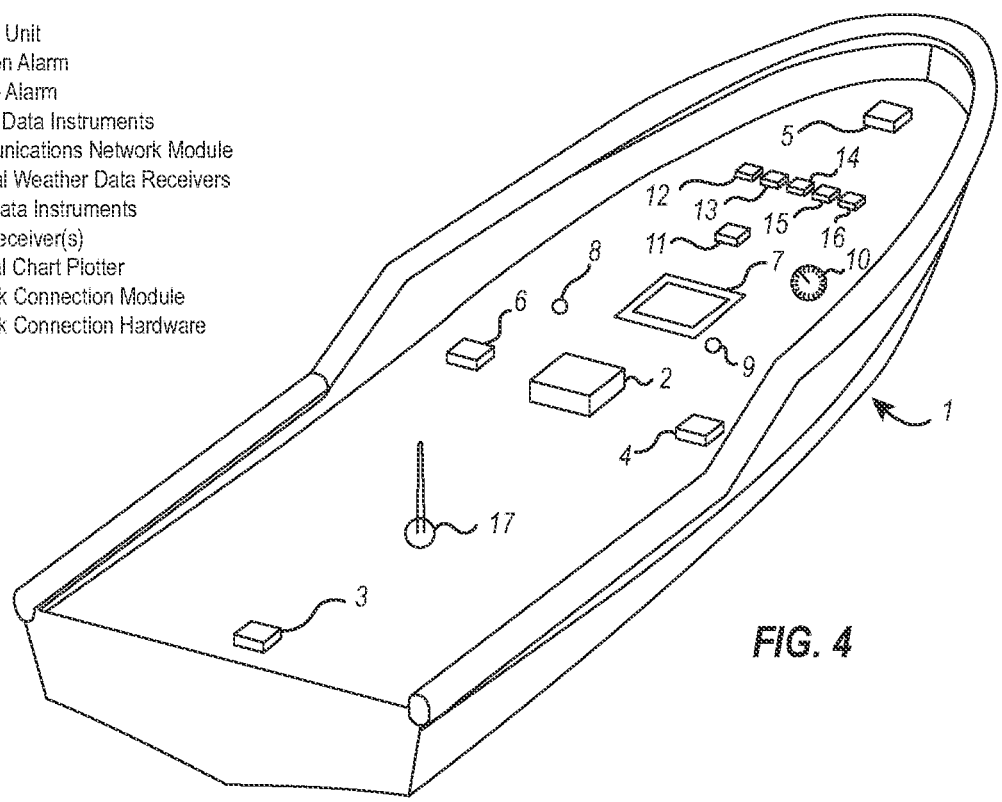
FIG. 4 is an isometric view of a planing hull craft, indicating various elements that interact with and provide additional data input into the solution according to an embodiment.

Referring to FIGS. 3 and 4, a monitoring/alerting system for detecting and predicting wave slam and alerting a vessel operator of the same can include a planing hull craft 1, a computing unit 2, one or more sensors 3-6, and a display unit 7. The one or more sensors 3-6 are arranged to collect acceleration data, which may be computed by the computing unit 2 and/or sensors 3-6 as acceleration over time. The measurements may, for example, be the root mean square values of the number of impacts experienced over a chosen period of time.

The sensors 3-6 can be positioned in any suitable location on the planing hull craft 1 for collecting acceleration information. For instance, FIGS. 3-6 show four sensors with sensor 3 located in the stern, sensor 4 located on the starboard side, sensor 5 located on the bow, and sensor 6 located on the port side of the planing hull craft 1. The sensors 3 and 5 can be arranged to measure the acceleration caused by longitudinal, bow-stern movements from mechanical shocks impacting the bow and/or the stern of the planing hull craft 1. The sensors 4 and 6 can be arranged to detect and/or measure acceleration caused by sway, port-starboard or starboard-port movements from mechanical shocks impacting the port or starboard sides of the planing hull craft 1. It should be appreciated that other sensor combinations and sensing functions may be implemented in other embodiments.

The sensors 3-6 can comprise any suitable sensing unit but are illustrated in the present example as multi-axis gyroscopic accelerometers 3-6. In an embodiment, measurements from the sensors 3-6 may be delivered to the computing unit 2 in various fashions. For example, often, such sensors generate a voltage based on movement. In many cases, the voltage is an alternating current voltage of a particular frequency, where the voltage can be correlated to a magnitude of movement and the frequency can be correlated to a type of movement (such as a vibration, including aftershocks, harmonic resonance, and the like). Thus, some embodiments may cause measurements from the sensors 3-6 to be delivered as root mean square voltage values of the voltage measurement and, alternatively or additionally a frequency measurement in Hertz (Hz) or other units of measurement, as is required and applicable. Other values may be provided depending on the type and configuration of sensors. Four sensors 3-6 are shown but embodiments may include any suitable numbers of sensors.

The computing unit 2 is communicatively coupled to sensors 3-6 and can provide information to an operator and/or remote data representative of accelerations from mechanical shocks impacting a vessel or planing hull craft 1. The computing unit 2 can include an I/O module arranged to communicate information between the computing unit 2 and the sensors 3-6. The computing unit 2 may be implemented using various items of computing hardware, including processors, memory, storage, communication hardware, and the like. It will be appreciated that the computing unit 2 may also be arranged to communicate information between the computing unit 2 and additional instruments and modules arranged to help the monitoring system to provide more accurate real-time acceleration information and acceleration predictions as discussed below. For instance, an I/O module of the computing unit 2 can be communicatively coupled via a network interface card to a communications network module 11 (such as a network router or other hardware device) that integrates marine electronic equipment on vessels (for example, hardware using NMEA 2000 protocols), engine data instruments 10, external weather data receivers 12, wind data instruments 13, GPS receiver(s) 14, and/or a nautical chart plotter 15 with the monitoring system.

Optionally, a network connection module 16 can connect different instruments so that they can receive and send data via a network. The network connection module 16 can allow instruments to receive network connectivity, such as through 4G, 3G or satellite network connection hardware 17, and likewise send information to be stored in one or more external databases, when and if applicable. Additionally, the network connection module 16 may not be limited to 4G, 3G or a satellite network connection, but may also be capable of utilizing other applicable types of communication networks available, including some that may not yet be commercially or otherwise available. It will be appreciated that the monitoring system of the present disclosure is not limited to the instruments and modules shown but other instruments and modules are possible.

Figure 5:
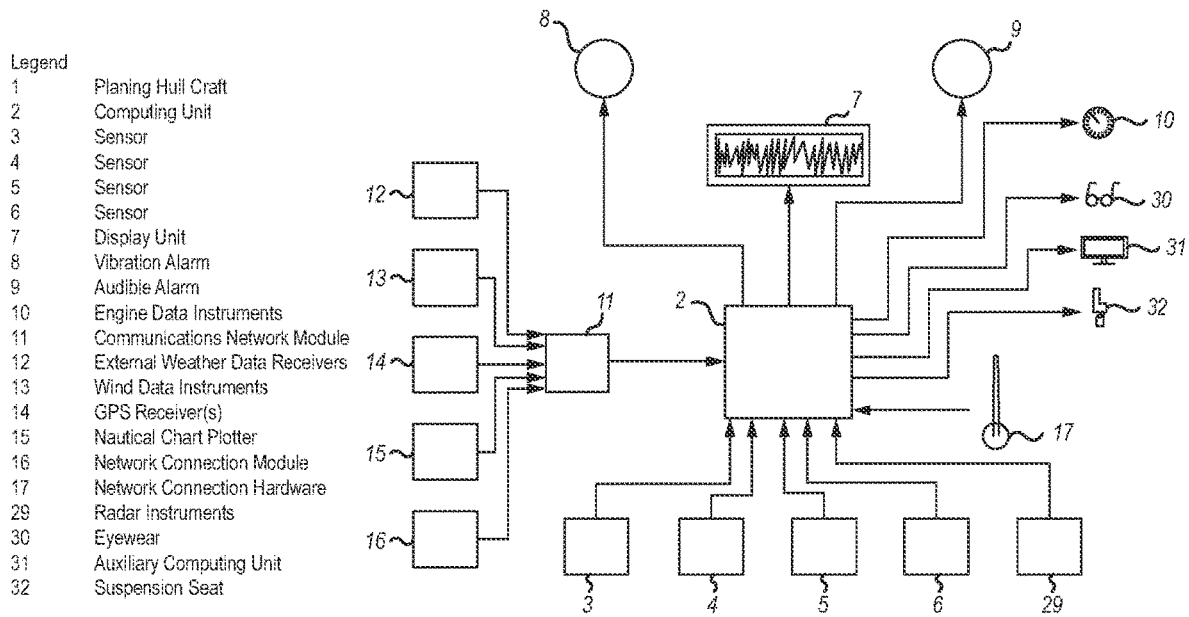
FIG. 5 is a chart showing the interactions of the elements according to an embodiment.
Figure 6:
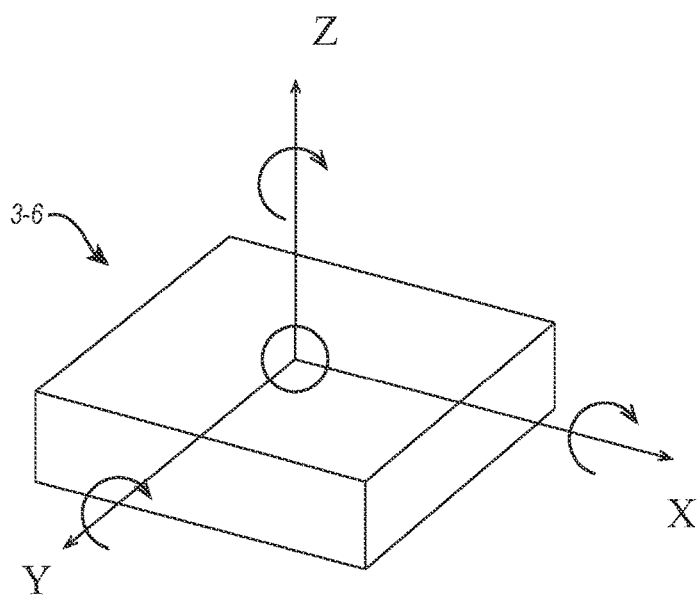
FIG. 6 is an isometric view of a multi-axis accelerometer, illustrating the directions and rotation of acceleration forces that the multi-axis gyroscopic accelerometers measure according to an embodiment.

Referring to FIG. 5, the system can optionally include primary and additional or auxiliary modules. For instance, modules 2-9 can comprise primary modules and modules 10-16 can comprise additional or auxiliary modules. It will be appreciated that the system can use all or some of the modules 2-16. As discussed above, the network connection module 16 can be integrated with marine electronic equipment (such as the communications network module 10) on vessels (for example, NMEA 2000 compliant hardware) so as to operate as an integrated communications network for the modules 11-15, receiving data from each and directing that data from a single source to the computing unit 2 where data analysis and generation can be performed. The computing unit 2 may receive data inputs from multiple module and/or instrument (e.g., 11-15) sources simultaneously. It will be appreciated that various functions of the monitoring system may be executed in whole or in part by the computing unit 2, the sensors 3-6, the display unit, and/or other units.

In other embodiments, the primary or auxiliary modules can include additional modules. For instance, the modules can include a smart and/or augmented reality device or eyewear 30 arranged to provide an operator with a line-of-sight display of information. Optionally, the augmented reality eyewear 30 can be arranged for intelligent display of information using a point-of-view camera. In an embodiment, the modules can include laser imaging and radar instruments 29 arranged to generate and/or present both visual and sensor-based data. For instance, the modules can include 360 degree cameras and Light Detection and Ranging (LIDAR) instruments arranged to provide visual and sensor-based data including, but not limited to, height, length, and distance to one or more waves. Such information can then be input in a data collection process as discussed below to enhance predicative capabilities of the present disclosure.

In other embodiments, the modules present other information. For example, the modules can include an auxiliary computing unit 31 comprising a fleet management system arranged to present information representative of a plurality of vessels in real time. In an embodiment, the auxiliary computing unit 31 can comprise a simulation system for boating and/or watercraft simulations. For instance, a simulator may use generated data or information to characterize sea states and conditions for training or other purposes. A fleet owner may use the auxiliary computing unit 31 to monitor a fleet as well as communicate with operators of craft.

In other embodiments, modules can be operatively coupled to the computing unit 2 to help protect an operator from injury. For instance, the modules can include at least one suspension seat 32 operatively coupled to the computing unit 2 and one or more hydraulic systems such that generated/collected data can be used to predict wave slamming and adjust suspension of the suspension seat 32 via control of the one or more hydraulic systems.

In yet other embodiments, modules can be operatively coupled to the computing unit 2 to control navigation of the craft based on information from the one or more sensors. For instance, the modules can include a steering and/or throttle mechanism so that the computing unit 2 can automatically control direction and/or speed of the craft based on information from the one or more sensors. This control can be fully automatic, or user assisted as appropriate. The modules can include a cruise control system operatively coupled to the computing unit 2 to control throttle and/or trim to reduce the likelihood of wave slamming based on information from the one or more sensors. Optionally, the modules can include a route guidance system arranged to instruct or direct an operator to take a specific path through waves to reduce the likelihood of wave slamming. If the computing unit 2 makes a specific determination based on information from the one or more sensors, the computing unit 2 may intervene with user control of the throttle and/or steering systems to override user control, or at least enhance user control by amplifying and/or dampening user control actions as appropriate to reduce wave slamming and/or the effects thereof.

In addition to the foregoing, one will appreciate that embodiments of the present disclosure can also be described in terms of flowcharts including one or more acts for accomplishing a particular result. For example, the acts of FIG. 7 and the corresponding text describe acts for generating and providing real-time and prediction information associated with wave slam on a watercraft. The acts of FIG. 7 are described below with respect to the components and modules of FIGS. 1-6.

Figure 7:
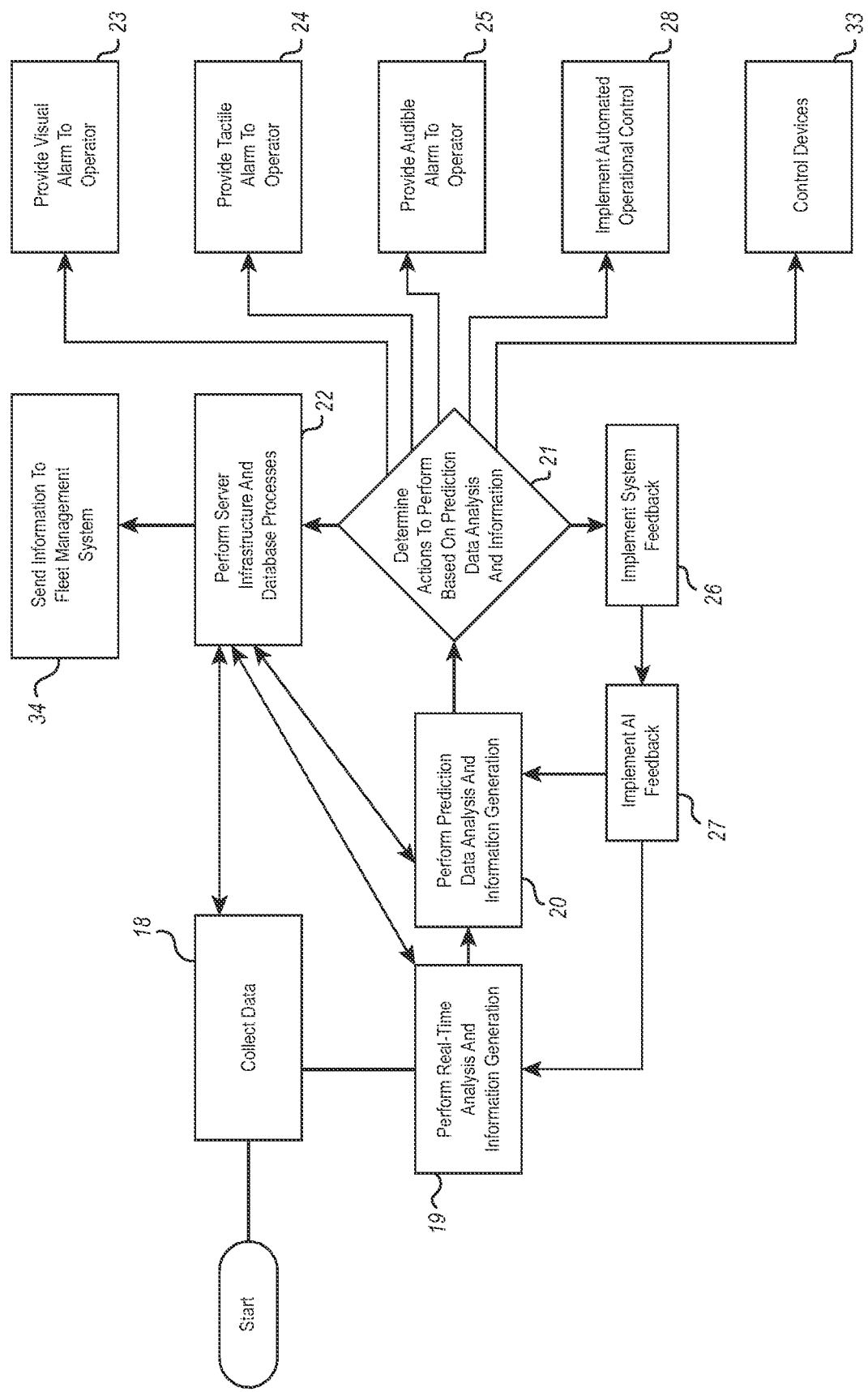
FIG. 7 is an overview of the acts in an embodiment of the wave slam monitoring method.

For instance, FIG. 7 illustrates a method in accordance with the present disclosure for generating and providing real-time and prediction information associated with wave slam on a watercraft. The method includes act 18 of collecting data. For example, data may be collected by generating real-time acceleration information representative of wave slam based at least in part of data obtained from one or more of the sensors 3-6. It will be appreciated that the method can include acts of measuring acceleration forces from mechanical shocks on a vessel using the one or more sensors 3-6 and receiving data from the sensors 3-6 by the computing unit 2. Act 18 can alternatively or additionally include collecting data from multi-axis gyros, accelerometers, engine instruments, wind data instruments, external weather data receivers, nautical chart plotters, GPS receivers, depth measuring instruments, integrated communications network modules, wave buoys, lasers, LiDAR, cameras (including 360 degree cameras), or other instruments. In some embodiments, act 18 may include collecting similar types of data from other vessels communicatively coupled to the craft 1.

Act 18 may further include collecting data about individual vessels. For example, devices on the craft 1 may have information that can identify the craft 1 specifically. For example, the network connection module 16 may include identifiers that can be attached to data, where the identifiers identify the module 16 and/or the craft specifically. In this way, accelerations and other measurements can be directly correlated to the craft 1. This can be useful when aggregating data from multiple different vessels as will be illustrated in more detail below.

Act 18 may further include collecting data about individual crew and/or passengers. For example, embodiments may include data sources that include crew and passenger manifests. In an embodiment, an operator may be prompted to input personal information into the monitoring system during a first monitoring period. For a subsequent monitoring period, the monitoring system may ask the operator for verification of personal information so that it can retrieve stored data from previous monitoring periods or events. This data may be retrieved from a local database of the computing unit 2 and/or external databases. This advantageously allows the monitoring system to accommodate multiple operators and adapt data analysis and predictions based on an individual operator's historical data. Alternatively, or additionally, vessel control information may be collected for crew members. For example, information may be collected from propulsion and steering mechanisms of the craft 1 indicating actions performed by an operator to control the craft. The specific controls performed can be correlated with a specific operator, other crew member, or even passengers. This data can be collected and used in subsequent acts. For example, embodiments may adjust actions performed based on known information about particular crew members or passengers. For example, embodiments may know that certain operators act in a particular fashion when certain conditions are encountered. This information can be used to adjust actions performed, such as appropriate alerts and/or automated control actions, as will be illustrated in more detail below. Indeed, some embodiments may create and maintain an operator risk profile defining the risk of wave slam and severity of potential wave slams correlated to specific operators.

Act 19 can include analyzing and/or transforming the received numerical data from various sensors. For example, Data from the sensors 3-6 and be analyzed and/or transformed to provide real-time acceleration information associated with the wave slam. For instance, the computing unit 2 can receive a single root mean square value from each multi-axis gyroscopic accelerometer 3-6 per second, totaling 4 root mean square values per second. The multi-axis gyroscopic accelerometers 3-6 may be capable gathering anywhere from 2 to 2000 measurements per second, which may be averaged into one root mean square output value per second per multi-axis accelerometer 3-6. Act 18 can include using one or more algorithms to more accurately determine real-time acceleration information with each second based on the multiple root mean square inputs from the sensors 3-6 (e.g., multi-axis gyroscopic accelerometers 3-6), repeating the process continuously while the monitoring system is active and in use. Note that data from other sensors and sources may additionally or alternatively be collected and applied to algorithmically determine real time acceleration forces, or for use in predicting acceleration forces as outlined in act 20.

FIG. 7 also show that the method can include the act 20 of performing prediction data analysis and information generation. For example, act 20 may include generating acceleration predictions associated with a predicted wave slam based at least in on part on the real-time acceleration information obtained from act 19 and/or data collected from various sensors and other sources. Act 20 may be performed as together with act 19 or may comprise an independent act. For instance, act 20 may include using analyzed root mean square data from several different prior time periods, for example, the last ten seconds, the last 5 minutes and the last 20 minutes, to analyze and predict potential near-future acceleration values. The length of prior time periods used for prediction analysis, the time intervals in which data is updated and the duration of the acceleration predictions may vary based on relevance when in the invention solution is in use. Act 20 can be performed at least in part by the computing unit 2.

FIG. 7 illustrates that the method can include an act 21 of determining actions to be performed based on prediction data analysis and information. In particular, various alerts, notifications, data collection operations, automated control procedures, and the like can be performed based on the prediction data analysis and information.

For example, FIG. 7 illustrates that act 21 can cause act 22 to be performed, which is an act of performing server infrastructure and database processes. In some embodiments, this may further include sending information to a fleet management system as illustrated in act 34. Note that in certain embodiments, the data will be sent to the server infrastructure and database, from where it can be pushed out to a fleet management system. In particular, some embodiments may be implemented where a device on the vessel itself never sends anything to the fleet management system. Rather, in those embodiments, the database/infrastructure is the "control center." Note that while acts 22 and 34 are illustrated subsequent to act 21, it should be appreciated that information can be sent to the server infrastructure and dataset at virtually any stage of the method. Additionally, data can be received from the fleet management system and from the server and infrastructure databases, such that acts 18, 19, and 20 can be iteratively performed after, and as a result of acts 22 and 34 as illustrated in FIG. 7.

A number of different advantages can be achieved by storing the historical data, analysis, and information. For example, as will be illustrated in more detail below, such information can be used to implement feedback controls, including basic system feedback controls and/or artificial intelligence (AI) based feedback controls.

Alternatively or additionally, acts 22 and/or 34 allow records to be compiled documenting impacts experienced by various vessels. These records can be later accessed to facilitate appropriate maintenance of vessels. Alternatively or additionally, these records can be used to perform valuations of crafts by identifying specific vessels that may have potentially been damaged. In some embodiments, these records can be aggregated to identify wave slam and severity of wave slam experienced by particular types of vessels. Thus, for example, a particular manufacturer and/or model number may be rated, using collected information, for wave slam propensity.

Alternatively or additionally, acts 22 and/or 34 allow records to be compiled documenting impacts experienced by specific crew members. These records can be later accessed to facilitate appropriate training of specific crew members. Alternatively or additionally, these records can be used to perform hiring and termination decisions for specific crew members Alternatively or additionally the information collected in acts 22 and/or 34 may be fed back to act 20 to be used in performing predictive data analysis. For example, consider the case where acts 22 and 34 collect information from a number of different vessels. This information can be used when performing act 20 to make predictions for a specific vessel. For example, knowing conditions experienced by vessels proximate the specific vessel can be used to predict future accelerations experienced by the specific vessel. For example, waves experienced by a nearby vessel may shortly be experienced by the specific vessel. A wake caused by a nearby vessel may cause a wave slam impact experienced by the specific vessel. Knowing about nearby vessels, can thus be used for prediction analysis for a specific vessel.

As noted above, the method may include one or more acts of presenting real-time acceleration information and/or prediction information to an intended recipient such as an operator. For example, the monitoring system may include a screen display (shown in FIGS. 3-5) arranged to present a graphical visual output of information (e.g. real-time acceleration information, stored acceleration information, prediction information, etc.) to the operator. The information may be in any suitable form, including, but not limited to forms optimized for, applicability, logic and function, ease of use, understanding, and/or visual appeal.

In some embodiments the presentation of information may include presenting an alarm or alert to the operator. For instance, the alarm may be presented if the information generated in acts 19 and/or 20 indicates that real-time acceleration or wave slam has surpassed a pre-determined acceleration hazard level. The pre-determined acceleration hazard level may depend on relevant conditions and usage. In an embodiment, the pre-determined acceleration hazard level may be based on European Directive 2002/44/EC's caution zone of 0.57 g acceleration, or other standards or criteria. It will be appreciated that the alarm may include a visual alarm shown by the display unit 7 (see act 23), a tactile (e.g., vibration) alarm (see act 24) output by the vibration alarm 8 and/or an audible alarm (see act 25) output by the audible alarm 9. In some embodiments, the presentation of information may include presenting via the augmented reality eyewear 30. For instance, the computing unit 2 can be operatively coupled with the augmented reality eyewear 30 to provide the operator with a line-of-sight display.

Note that some embodiments may include functionality for implementing automated controls. For example, act 28 illustrates an act of implementing automated operational control. This may include, for example, implementing cruise control functions, throttle control, route guidance, trim control, etc.

Note that this functionality is particularly useful when implementing unmanned vessels. Such functionality may be used to prevent and/or reduce the effects of wave slam. In particular, the automated operation controls to prevent and/or reduce the effects of wave slam may be implemented in conjunction with other automated operation controls for navigation or other unmanned vessel controls. Indeed, while examples have been shown with respect to mitigating wave slam, this functionality may be useful in seakeeping in general.

However, this can also be implemented in manned and operator-controlled systems. For example, embodiments can make slight adjustments in response to operator action to reduce wave slam. In some embodiments, the adjustments can be made in anticipation of operator actions, particularly when data has been collected about particular operators such that specific operator tendencies can be compensated for. Some such embodiments can allow less experienced operators to be able to capably operate a vessel in conditions in which the operator may be otherwise less capable of operating the vessel. In some embodiments, the automated controls can coach the operator, using visual, audible, tactile, or other cues (see acts 23, 24 and 25) during normal operation. In some embodiments, this can be done for training purposes. Note that this functionality can be used ensure that the vessel takes evasive maneuvers or actions to minimize or prevent wave slam or other impacts by performing automated controls if the operator is not able to act with sufficient speed and/or sufficient magnitude of action. The automated controls can also compensate for over-reaction by an operator. As noted, when the automated controls compensate for the operator, feedback can be provided to the operator to indicate that compensation was performed and/or actions that the operator can take in the future to reduce automated operation control compensation. In some embodiments, an operator can determine that they are incapable of operating the vessel safely, and can therefore activate the automated controls to prevent and/or reduce the effects of wave slam and other impacts. This allows for the implementation of partially manned vessels as operators begin to trust the capabilities of the system.

FIG. 7 illustrates that embodiments may perform act 33 to control devices. For example, real-time and prediction data may be used as input for various devices. For example, embodiments could control a smart seat 32 having a hydraulic suspension system to reduce impacts to crew and passengers. While a smart seat device is indicated, it should be appreciated that other devices can be controlled as well. Indeed, some embodiments may use Internet of Things (IoT) communication methods to communicate with various devices to control these devices based on predicted accelerations, or by using other data available on the boat that the system will be using to communicate with equipment onboard.

Embodiments may optionally implement various feedback actions. While FIG. 7 illustrates implementing system feedback (act 26) and implementing AI feedback (act 27) the feedback actions are optional, such that either, both, or neither (i.e., open loop control) can be implemented in various different embodiments of the invention.

With that context, FIG. 7 show that the method can include an act 26 of implementing system feedback. System feedback generally adjusts and/or compensates for inputs to achieve a desired result. In particular, current input values into a system are adjusted (or compensated for) based on differences between current outputs and desired outputs and/or expired acceleration prediction information. This may include, for example, comparing real-time acceleration information with desired acceleration information and/or expired acceleration prediction information to determine compensation for inputs. For example, if there is an acceptable amount of wave slam, and a current acceleration measurement indicates that this acceptable amount has been exceeded (in spite of warnings to the operator and/or automatic controls being implemented), act 26 can cause information and analysis produced at acts 19 and 20 to be modified and/or compensated for, which will result in different actions and/or magnitudes of actions being indicated by act 21 and being performed by acts 23, 24, 25, 28 and/or 33. For example, if a particular amount of measured real-time acceleration causes a certain amount of automated steering to be performed by act 28, and that steering still results in an unacceptable amount of wave slam, act 26 can cause the amount of measured real-time acceleration to be adjusted by adding or subtracting an amount to the real-time measured acceleration, which will result in a different amount of automated steering being performed by act 28 to attempt to reduce the amount of wave slam. Thus, system feedback can make the output of the system more accurate.

Act 26 may be performed independently or with other acts. For instance, the computing unit 2 can compare desired acceleration continuously with real-time acceleration information to determine the accuracy of the acceleration predictions generated in act 20. Such comparisons typically produce an error result which characterizes the magnitude in the error of what was desired versus what actually occurred. Optionally, the comparison results may then be fed back, such as by using a negative feedback loop, into the real-time data analysis function in the act 18 to minimize systematic errors through adjustments in, for example, time interval measurements and number of numerical distribution iterations.

In some embodiments, there may be a desire to minimize the difference between a current result (i.e., a current amount of wave slam) and an aggregation of all previous expired acceleration prediction information. The feedback principles discussed above can be used to accomplish this functionality.

Act 26 can alternatively or additionally include feeding back comparison results into the prediction analysis function performed in the act 20 to improve prediction accuracy for the remaining duration of a monitoring period (e.g., a sea journey) using identified discrepancies. For example, the discrepancies identified in act 26 can be assimilated into act 19 and/or act 20. This can beneficially help determine from which information group (i.e. the expired acceleration prediction information or the real-time acceleration information for the same period) the discrepancies originate, which, in turn, can be utilized to reduce systematic errors to the extent possible in both the real-time analysis and/or the prediction analysis for wave slam. In an embodiment, feedback from an operator's use of the prediction information based on engine data may be analyzed to provide further input into the discrepancy and systematic error elimination. For example, as discussed previously, information can be collected on particular operators, including the identity of the operators and tendencies of the operators. This may include, for example, data on throttle control, which shows how the operator reacted to the presented information from the system, and in general shows the operator's propensity for speed and risk-taking. This information may be used in acts 19 and/or 20 as appropriate as discussed above, to minimize wave slam and/or other accelerations of the craft 1.

FIG. 7 also show the method includes act 27 of implementing an artificial intelligence feedback to provide an automated learning functionality. This can allow a combination of input data and system and operator feedback analysis to be used continuously to improve and update the real-time acceleration information and prediction information and mechanisms. While the act 26 can improve system output without modifying the system components, act 27 can improve the actual system itself by automatically modifying system components. In particular, AI (typically implemented using machine learning or deep learning) can automatically update the mechanisms for performing acts 19, 20, 21, 23, 24, 25, 28 and/or 33 to create an improved system, rather than simply changing or compensating for the data input into the system. Act 27 can include analyzing data, including expired data predictions, real-time data, desired results, and/or user input regarding the same. For example, embodiments may use various models which can be updated based on expired data predictions, real-time data, desired results, and/or user input. Updating the models can result in a more accurate system for preventing and/or reducing the effects of wave slam.

For example, various supervised, unsupervised, semi-supervised, and/or reinforcement learning models and systems may be implemented to improve system behavior.

Act 27 can include monitoring, and/or recording operator behavior over an extended period of time, improving the accuracy of the acts 19, 20, 21, 23, 24, 25, 28 and/or 33 through AI feedback as illustrated above. It will be appreciated that such a personal data log function may be included in any of the method acts regardless of whether artificial intelligence is in place or use.

In other embodiments, the data collection process may include the use of 360 degree cameras and LIDAR sensing methods or other laser imaging and radar instruments to provide both visual and sensor-based data on wave patterns (e.g., height, length, and distance to waves). This advantageously can help increase predictive capabilities of the present disclosure.

Figure 8:
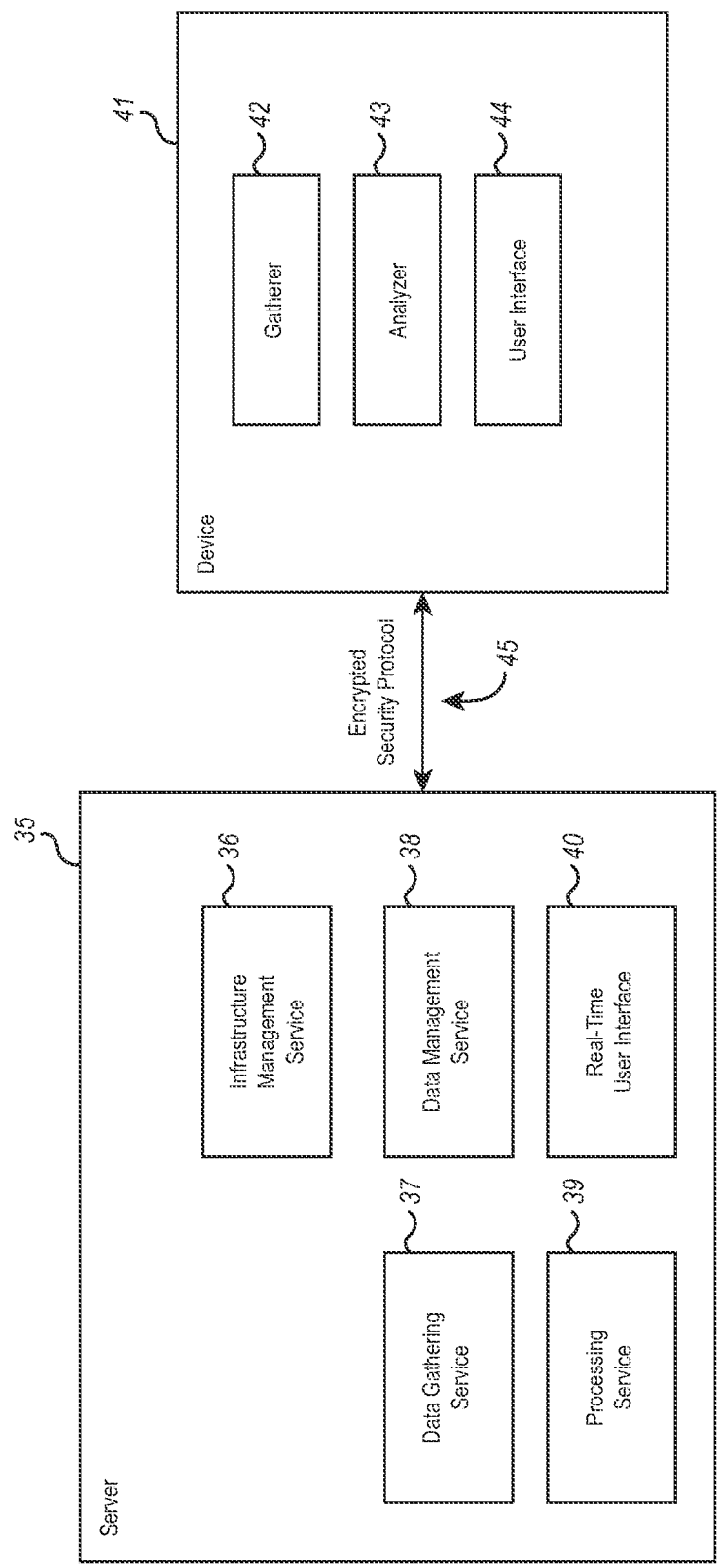
FIG. 8 is an overview of a system for wave slam monitoring.

Referring now to FIG. 8, additional details are illustrated. The system in FIG. 8 uses a server 35. Note that while the server 35 is illustrated as a single entity in FIG. 8. The server 35 may be implemented using distributed systems, or other topologies. The server includes a number of services and other components. Each of the components can be implemented using appropriate computer hardware and software (which in many embodiments is shared between the various components), such as processors, memory or other storage media for storing computer executable instruction that can be executed by the processors to perform the functionality of the components, communication hardware, display devices, and other hardware as discussed further herein.

The server 35 includes a data gathering service 37. The data gathering service 37 gathers data from sensors, external forecasting services, other data services, other vessels, and/or other data sources as appropriate. The actions of the data gathering services are illustrated, for example, at act 18 described above.

The server 35 further includes a data management service 38. The data management service collects, stores, curates, organizes, and otherwise manages data collected by the data gathering service 37. Examples of action performed by the data management service 38 are described above in the description of acts 22 and/or 34. Although in some embodiments, the acts performed by act 34 may be performed by a service external to the server 35.

The server 35 manages various devices and computing units (such as device 41, seat 32, computing unit 2, and other devices and computing units), performs authorization and performs account management through an infrastructure management service 36. This may include management of all connected computing units and devices, managing authorization for connected computing units to communicate data to the server infrastructure, and management of individual accounts linked to the connected computing units. The infrastructure management service may perform, or at least facilitate the action performed in acts 23, 24, 25, 28, and/or 33 illustrated above.

The server 35 further includes a data processing service 39. The data processing service 39 receives data from the data management service 38. The data processing service 39 uses the sourced data (such as time series collected data or other collected data), along with existing data and/or previously generated data to create accurate forecasts and short-term predictions as described previously. For example, the actions of acts 19, 20, 21, 26, and/or 27 can be performed by the data processing service 39.

The server infrastructure 35 may also include a user interface 40. The user interface 40 can present information to a user (including vessel operators, vessel owners and/or managers, insurance companies, or other users) on real-time processed data, historical data, or other relevant data. Such data may be presented on online platforms, such as dedicated websites, applications or other web-based or other interfaces. For example, some embodiments may implement real-time web dashboards available to users. Thus, some embodiments may implement a new and novel user interface capable of providing information to users that was previously not able to be provided. For example, embodiments can provide real-time alerts in a user interface alerting a user as to predicted wave slams.

Devices (represented by device 41) communicate with the server 35 by means of communication hardware and a messaging protocol 45. For example, one such protocol may include a publish-subscribe-based messaging protocol, including encrypted Message Queuing Telemetry Transport (MQTT), or other comparable modalities. Each connected device may be connected to the server 35 in this way. The device 41 may use network communication devices, such as a network connection module 16 for network connectivity to enable communication with the server infrastructure 35. Note that device 41 represented here is a device that is in placed on a vessel to collect data and feed to the server, as described above.

In some embodiments, the device 41 may include the computing unit 2 illustrated above, and/or other sensor, communication, or other elements illustrated above. Indeed, in some embodiments, the tools illustrated below may be implemented in the computing unit 2, or in other elements of the device 41 as appropriate.

The device 41 includes one or more tools to perform functions that enable the analytical processes illustrated herein, including those illustrated above in FIG. 7. These tools may be implemented using various hardware and software components, such as various processors, memory or other storage, computer readable instructions stored in the memory or other storage, communication hardware, etc.

One tool that can be included in the device 41 is a data gatherer 42. In some embodiments, the data gatherer gathers data available in a local environment. This could be sensor data (including accelerometers, speedometers, throttle inputs, steering and trim inputs, etc.), data from other entities, such as nearby vessels in communication with the craft 1, or from other sources. This data is communicated to the server 35 and captured by the data management service 38.

The device 41 may additionally or alternatively include a data analyzer 43 where short-term real-time data collected by the device 41 may be paired with data maintained on the server infrastructure 35 to evaluate current conditions and make predictions with the support of the server 35, data management service 38, and processing service 39. Furthermore, the device 41 may present analyzed real-time or prediction data to the user of the device 41 through a user interface. Such user interface may be implemented as a graphical user interface, or other interface implemented at the device 41.

The server 35 and device 41 maintain regular communication in order to gather, process, and present analyzed data to the end-user of the system.

As discussed above, in other embodiments, collected and/or generated information can be used for fleet management purposes, boating and watercraft simulations, fleet monitoring, and/or communicating with operators. In other embodiments, the collected and/or generated information can be used for operator safety. For instance, the computing unit 2 can be operatively coupled to the suspension seat 32 and associated hydraulic system to adjust suspension in the suspension seat 32 for anticipated predicted wave slamming based on collected and/or generated information.

In other embodiments, collected and/or generated information can be used to direct or control speed and/or steering of the craft. For instance, based on collected and/or generated information, a route guidance system can direct or instruct on operator to direct the craft to take a specific path through waves to reduce the likelihood of wave slam.

Accordingly, FIGS. 1-8 provide a number of components, schematics and mechanisms for allowing the generation of real-time acceleration information and/or prediction information associated with wave slam. The information can also provide feedback to continuously improve the accuracy of such information.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, or a combination, all of which can be behaviorally equivalent. Modules may be implemented using computer hardware in combination with software routine(s) written in a computer language. It may be possible to implement modules using physical hardware that incorporates discrete or programmable analog and/or digital hardware. Examples of programmable hardware include computers, microcontrollers, microprocessors, application-specific integrated circuits, field programmable gate arrays, and complex programmable logic devices.

As noted above, the software may be embodied on a computer readable medium which when executed by a processor component of a computer device performs a sequence of acts. The application may be a mobile application or application software configured to run on smartphones, tablets computers, and/or other mobile devices. Moreover, embodiments of the present disclosure may comprise or utilize a special-purpose or general-purpose computer system that includes computer hardware, such as, for example, one or more processors and system memory, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the disclosure.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RANI and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A method of monitoring accelerations on a vessel, comprising the acts of:
   measuring acceleration on the vessel using one or more sensors, the one or more sensors communicatively coupled to a computing unit;
   generating real-time acceleration information representative of an acceleration on the vessel based at least in part on the measured acceleration from the one or more sensors;
   generating acceleration prediction information representative of predicted wave slam using the computing unit, and
   using the acceleration prediction information, performing automatic control of trim, steering, or throttle controls of the vessel in a fashion computed to reduce the effects of the predicted wave slam, wherein the automatic control of trim, steering, or throttle controls is performed using system feedback including a negative feedback loop including iteratively identifying an acceptable amount of wave slam, determining that the predicted amount of wave slam exceeds the acceptable amount of wave slam, computing a compensation amount for adjusting trim, steering or throttle controls, and compensating by adjusting trim, steering, or throttle controls.

2. The method of claim 1, further comprising providing route guidance to instruct or direct an operator to take a specific path through waves to reduce likelihood of wave slamming.

3. The method of claim 1, wherein generating acceleration prediction information representative of predicted wave slam using the computing unit comprises generating acceleration prediction information based on historical data previously collected specific to an individual operator or vessel.

4. The method of claim 1, wherein using the acceleration prediction information, performing automatic control of trim, steering, or throttle controls of the vessel in a fashion computed to reduce the effects of the predicted wave slam is performed based on known information about one or more particular crew members, passengers, or vessels.

5. The method of claim 4, wherein the known information about one or more particular crew members, passengers, or vessels comprises information about a particular fashion in which an operator or vessel acts when certain conditions are encountered.

6. The method of claim 1, wherein the sensors and the computing unit are located on the vessel.

7. The method of claim 1, wherein the computing unit is located remote to the vessel carrying the one or more sensors.

8. The method of claim 1, wherein performing automatic control of throttle or trim controls of the vessel comprises performing fully automatic controlling of trim, steering, or speed of the vessel.

9. The method of claim 1, wherein performing automatic control of throttle or trim controls of the vessel comprises performing user assisted control of trim, steering, or speed of the vessel by at least one of amplifying or dampening operator actions.

10. The method of claim 9, further comprising providing feedback to the operator to indicate that user assisted control was performed and providing suggested actions to the operator that can be taken in the future by the operator.

11. The method of claim 1, further comprising:
obtaining information about conditions experienced by a different vessel proximate the vessel; and
wherein generating acceleration prediction information representative of a predicted acceleration using the computing unit is based at least in part on the information about conditions experienced by the different vessel proximate the vessel.

12. A monitoring and control system for a vessel comprising:
one or more sensors configured to measure acceleration on the vessel;
a computing unit communicatively coupled to the one or more sensors, wherein the computing unit is configured to generate real-time acceleration information representative of an acceleration on the vessel based at least in part on the measured acceleration from the one or more sensors;
wherein the computing unit is configured to generate acceleration prediction information representative of predicted wave slam; and
wherein the computing unit is configured to use the acceleration prediction information to perform automatic control of trim, steering, or throttle controls of the vessel in a fashion computed to reduce the effects of the predicted wave slam, wherein the automatic control of trim, steering, or throttle controls is performed using system feedback including a negative feedback loop including iteratively identifying an acceptable amount of wave slam, determining that the predicted amount of wave slam exceeds the acceptable amount of wave slam, computing a compensation amount for adjusting trim, steering or throttle controls, and compensating by adjusting trim, steering, or throttle controls.

13. The system of claim 12, wherein the computing unit is further configured to provide route guidance to instruct or direct an operator to take a specific path through waves to reduce likelihood of wave slamming.

14. The system of claim 12, wherein generating acceleration prediction information representative of predicted wave slam comprises generating acceleration prediction information based on historical data previously collected specific to an individual operator or vessel.

15. The system of claim 12, wherein using the acceleration prediction information, performing automatic control of trim, steering, or throttle controls of the vessel in a fashion computed to reduce the effects of the predicted wave slam is performed based on known information about one or more particular crew members, passengers, or vessels.

16. The system of claim 15, wherein the known information about one or more particular crew members, passengers, or vessels comprises information about a particular fashion in which an operator or vessel acts when certain conditions are encountered.

17. The system of claim 12, wherein the sensors and the computing unit are located on the vessel.

18. The system of claim 12, wherein the computing unit is located remote to the vessel carrying the one or more sensors.

19. The system of claim 12, wherein performing automatic control of throttle or trim controls of the vessel comprises performing fully automatic controlling of trim, steering, or speed of the vessel.

20. The system of claim 12, wherein performing automatic control of throttle or trim controls of the vessel comprises performing user assisted control of trim, steering, or speed of the vessel by at least one of amplifying or dampening operator actions.

* * * * *